US011622280B2

(12) United States Patent
Al-Mufti et al.

(10) Patent No.: US 11,622,280 B2
(45) Date of Patent: Apr. 4, 2023

(54) METHODS AND SYSTEMS FOR LOCATION DETERMINATION OF RADIOS CONTROLLED BY A SHARED SPECTRUM SYSTEM

(71) Applicant: CommScope Technologies LLC, Hickory, NC (US)

(72) Inventors: Khalid W. Al-Mufti, Sterling, VA (US); Michael Gregory German, Secaucus, NJ (US); Ariful Hannan, Sterling, VA (US)

(73) Assignee: CommScope Technologies LLC, Hickory, NC (US)

(*) Notice: Subject to any disclaimer, the term of this patent is extended or adjusted under 35 U.S.C. 154(b) by 373 days.

(21) Appl. No.: 17/069,022

(22) Filed: Oct. 13, 2020

(65) Prior Publication Data

US 2021/0120430 A1    Apr. 22, 2021

Related U.S. Application Data

(60) Provisional application No. 62/916,054, filed on Oct. 16, 2019.

(51) Int. Cl.
| | | |
|---|---|---|
| *H04W 16/14* | (2009.01) | |
| *H04W 64/00* | (2009.01) | |
| *G06T 7/73* | (2017.01) | |
| *H04W 52/38* | (2009.01) | |

(52) U.S. Cl.
CPC ............ *H04W 16/14* (2013.01); *G06T 7/73* (2017.01); *H04W 52/386* (2013.01); *H04W 64/003* (2013.01); *G06T 2207/10028* (2013.01)

(58) Field of Classification Search
CPC .... G01S 13/89; G01S 5/0252; G01S 5/02213; H04W 16/14; H04W 52/386; H04W 64/003; H04W 24/02; H04W 16/18; G06T 7/73; G06T 2207/10028
See application file for complete search history.

(56) References Cited

U.S. PATENT DOCUMENTS

| | | | | |
|---|---|---|---|---|
| 2010/0279616 A1* | 11/2010 | Jin | .................. | H04W 16/28 455/62 |
| 2011/0244892 A1* | 10/2011 | MacManus | ............. | H04W 4/02 455/457 |
| 2020/0015096 A1* | 1/2020 | Wirola | ................ | G01S 5/02213 |
| 2021/0274358 A1* | 9/2021 | Shankar | ................ | H04W 88/08 |

OTHER PUBLICATIONS

Badvr, "See Signal", at least as early as Sep. 21, 2020, pp. 1 through 5, https://www.badvr.com/seesignal.html.

(Continued)

*Primary Examiner* — Margaret G Mastrodonato
(74) *Attorney, Agent, or Firm* — Fogg & Powers LLC

(57) ABSTRACT

Techniques are provided for accurately determining actual and prospective location(s) of radio(s) located in a structure and controlled by a shared spectrum system. By more accurately knowing the location(s) of the radios, the shared spectrum system can more efficiently allocate maximum transmission power(s) to the radio(s), enhance corresponding radio coverage area(s), and/or diminish interference to other radio(s) and/or primary user(s).

17 Claims, 8 Drawing Sheets

(56) References Cited

OTHER PUBLICATIONS

Boland, "XR Talks: Lessons From Building AR for Goggle Maps, Part 1", AR Insider, Jul. 12, 2019, pp. 1 through 12, https://arinsider.co/2019/07/12/xr-talks-lessons-from-building-ar-for-ggogle-maps-part-i/.

Chuang, "Reality Check: The marvel of computer vision technology in today's camera-based AR systems", AR VR Journey, Jun. 3, 2019, pp. 1 through 21, https://arvrjourney.com/reality-check-the-marvel-of-computer-vision-technology-in-todays-camera-based-ar-systems-69b00947f954.

CommScope, "Vera at CommScope", at least as early as Oct. 16, 2020, 2 minutes and 6 seconds, https://share.vidyard.com/watch/qacTQBJTBugAuZYwWQwfQw.

CommScope, "imVision Augmented Reality demonstrations", May 15, 2018, 2 minutes and 59 seconds, https://www.youtube.com/watch?v=IMfhax8yJK4&feature=youtu.be.

Cost Action 231, "Digital mobile radio towards future generation systems", Final Report, Directorate-General Telecommunications, Information society, Information Market and Exploitation of Research, 1999, pp. 1 through 516, European Commission.

Geourb Office, "3D Laser Scanning—Telenor Data Center", Aug. 3, 2016, 3 minutes and 21 seconds, https://www.youtube.com/watch?v=awnAVUv-36Q.

Kudanslam, "KudanSLAM: A detailed look at the point cloud", Jan. 31, 2017, 1 minute and 18 seconds, https://www.youtube.com/watch?v=RbOcpOmEbil.

OGC, "OGC seeks public comment on draft charter for new Geospace Standards Work", Aug. 15, 2019, pp. 1 through 2, https://www.ogc.org/pressroom/pressreleases/3041?utm_content=buffer34516&utm_medium=social&utm_source=linkedin.com&utm_campaign=buffer.

Palladino, "Magic Leap App SeeSignal Uses AR to Help You Find & Touch the Strongest Cellualr, Wi-Fi, & Bluetooth Signals", AR Business, Sep. 30, 2019, pp. 1 through 5, https://magic-leap.reality.news/news/magic-leap-app-seesignal-uses-ar-help-you-find-touch-strongest-cellular-wi-fi-bluetooth-signals-0207839/.

Resonai, "Built on Vera: Visual ticketing system", May 9, 2019, 1 minute and 35 seconds, https://www.youtube.com/watch?v=-t85x8gbqK4.

Saunders et al., "Antennas and Propagation for Wireless Communication Systems", 2007, pp. 1 through 4, ep.13.3, John Wiley & Sons, Ltd.

Wif, "Requirements for Commercial Operation in the U.S. 3550-3700 MHz Citizens Broadband Radio Service Band", Working Document WINNF-TS-0112, Version V1.4.1, Jan. 16, 2018, pp. 1 through 77, The Software Defined Radio Forum Inc.

Wif, "Signaling Protocols and Procedures for Citizens Broadband Radio Service (CBRS): Spectrum Access System (SAS)—Citizens Broadband Radio Service Device (CBSD) Interface Technical Specification", Document WINNF-TS-0016, Version V1.2.1, Jan. 3, 2018, pp. 1 through 60, The Software Defined Radio Forum Inc.

\* cited by examiner

METHODS AND SYSTEMS FOR LOCATION DETERMINATION OF RADIOS CONTROLLED BY A SHARED SPECTRUM SYSTEM

CROSS-REFERENCE TO RELATED APPLICATIONS

The present application claims benefit of U.S. Patent Application Ser. No. 62/916,054 filed Oct. 16, 2019; the entire contents of the aforementioned patent application is incorporated herein by reference as if set forth in its entirety.

BACKGROUND

Shared spectrum systems include primary users of shared spectrum and secondary users of shared spectrum. Primary users have priority access to the spectrum shared with the secondary users. If a priority user requires access to shared spectrum, all or some of the secondary users proximate to the primary user must cease transmission or reduce transmission power so that aggregate interference in the shared spectrum is not greater than a threshold level. Shared spectrum systems may also be referred to as shared access systems (SASs).

To determine whether transmission must cease, or transmission power must be reduced, the location(s) of CBSD(s) of the secondary users must be accurately known by the SAS. CBSDs of secondary users may be deployed within buildings which obstruct signal reception from geo-location services such as global navigation satellite systems (GNSSs) which are commonly used to determine location. Without accurate location(s) of CBSD(s), the SAS may assign transmit power (or power spectral density) levels which are not optimal to such CBSD(s). As a result of the non-optimal assignments, CBSD coverage area(s) may be diminished when an assigned maximum transmission power is too low, or interference to primary user(s) and other CBSD(s) which utilize the same spectrum is increased when the assigned maximum transmission power is too high.

SUMMARY OF THE INVENTION

A program product is provided. The program product comprises a non-transitory processor readable medium on which program instructions are embodied, wherein the program instructions are configured, when executed by at least one programmable processor, to cause the at least one programmable processor to: create a point cloud corresponding to at least a portion of a structure, where the point cloud comprises points and relative vector position data for each point with respect to other points in the point cloud; obtain absolute location data for at least one reference point in or outside of the point cloud, where the absolute location data comprises an absolute geographic location; generate absolute location data for at least one point in the point cloud using the obtained absolute location data; identify, in the at least the portion of the structure, at least one radio that utilizes frequency spectrum shared with a primary user that has priority over the at least one radio to use the shared frequency spectrum; and determine absolute location data of each of the at least one radio, where the absolute location data of each radio is configured to be used to determine a maximum transmit power of a corresponding radio.

DRAWINGS

DETAILED DESCRIPTION

Figure 1A:
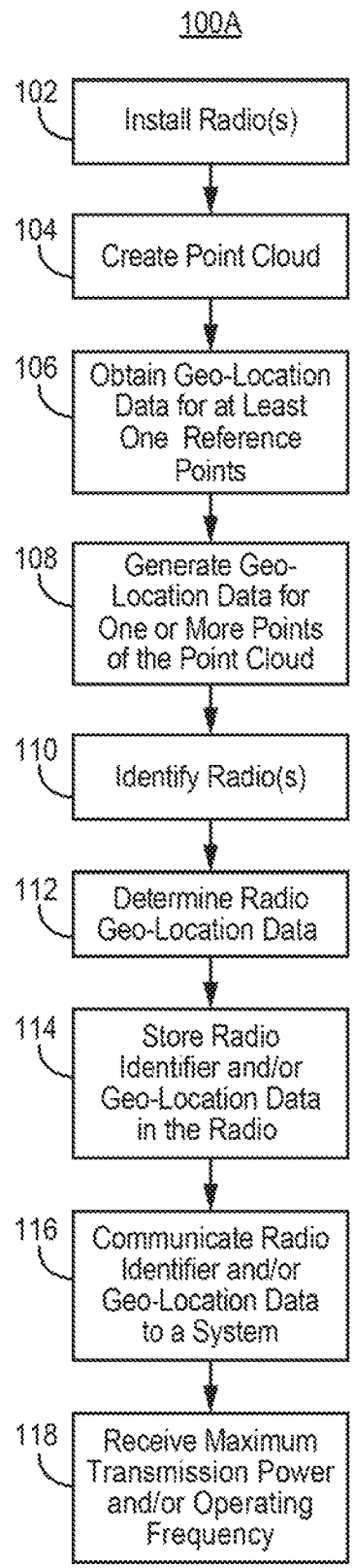
FIG. 1A illustrates a flow diagram of one embodiment of a method of identifying the location(s) of radio(s) of a shared spectrum system.

Techniques for accurately determining actual and prospective location(s) of CBSD(s), of secondary users and controlled by a SAS, which are located in a structure, e.g., a building, a tunnel, etc., are subsequently described. Further, techniques are disclosed for assisting an installer to identify where to locate CBSD(s) is also disclosed. By more accurately knowing location(s) of CBSD(s), a SAS can more efficiently allocate maximum transmission powers to the CBSD(s), enhance corresponding CBSD coverage area(s), and/or diminish interference to other CBSD(s) and/or primary user(s).

Although the invention is applicable to and is exemplified in the context of CBRS for pedagogical purposes, it applies to other shared spectrum systems, such as licensed shared access systems. The invention will be subsequently described in more general terms, e.g., using the term radio rather than CBSD of a CBRS. Also, radio means a radio controlled by a shared access system, licensed shared access system, or a similar shared spectrum system. Further. power means power or power spectral density. Unless otherwise distinguished herein, power means power or power spectral density.

A CBRS comprises general authorized access (GAA) and/or priority access license (PAL) CBSDs and higher priority users, e.g., incumbent or primary users. The higher priority users, such as government users for example radar systems, e.g., on ships, have priority access to certain spectrum in the shared spectrum. A shared access system (SAS) controller grants the CBSDs access to the shared spectrum, including assigning frequency spectrum (or channels) and optionally maximum transmission power. A SAS controller controls the transmission of GAA CBSDs so that they do not interfere with PAL CBSDs and the higher priority users. The SAS controller may also be referred to as a spectrum access system. The GAA and PAL CBSDs are secondary users; the PAL CBSDs are secondary users because they have lower priority than higher priority users such as naval vessels. The SAS controller also controls the transmission of PAL CBSDs so that they do not interfere with the higher priority users.

GAA CBSDs may be of two types: category A (low power) and category B (high power). Category A has a maximum transmission power spectral density of 30 dBm/

10 MHz. Category B has a maximum transmission power spectral density of 47 dBm/10 MHz.

Incumbent users of shared spectrum have first, or highest, priority to utilize the shared spectrum controlled by the SAS controller. Thus, incumbent users shall be able to operate free of interference from other users, e.g., communications systems of priority access licensees and general authorized access users. Free of interference as used herein does not mean an absence of interference, but rather means an acceptable level of interference which may be no interference or a finite level of interference. The acceptable level of interference may vary by geography, frequency spectrum, user type, license type, and/or other indicia. In one embodiment, the incumbent users include government entities operating systems such as communications systems, operators of fixed satellite communications systems, and grandfathered, prior licensees of the frequency spectrum. Communications systems, as used herein, shall include radar systems (or radars).

In one embodiment, PAL users have second (or intermediate) priority, after incumbent users, to utilize the frequency spectrum controlled by the SAS controller. In another embodiment, a PAL user shall be able to operate, when incumbent users are free of interference of such a PAL user, and free of interference from other PAL users and general authorized access users. In one embodiment, an ability of a PAL user to operate free of interference shall be limited temporally, geographically, and spectrally within the specifications of its license.

GAA users have third, or lowest, priority to utilize the frequency spectrum controlled by the CBRS. In one embodiment, an operation of GAA users will be governed by laws, regulations, and/or rules (e.g., pertaining to CBRS). Such laws, regulations, and/or rules may be established by government(s) and/or standards bodies. For example, such rules shall only let GAA users' CBSDs operate when they do not interfere with communication systems of incumbent and PAL users.

In one embodiment, the geographic coverage area proximate to (e.g. covered by radio frequency emissions of) the CBSD may include exclusion zones and protection regions (including location(s) of fixed satellite service(s) (FSS(s)), priority access license (PAL) protection area(s) (PPA(s)), grandfathered wireless protection zone(s) (GWPZ(s)), DPA(s), and receiver system(s) of environmental sensing capability (ESC) system(s)). CBSDs are prohibited from operating in specific frequency spectrum in exclusion zones. Further, the level of interference generated by, e.g., by all non-government users and even some government users (including incumbent, PAL, and GAA users) shall be limited in a protection region so as not to interfere with certain incumbent user(s)' communications systems, for example radar on naval vessels, intended to be protected by the protection region. CBSDs may only operate with the permission of the SAS controller when an incumbent user's communication system is operating in a protection zone. In some cases, this operation will be based upon information received by an environmental sensing capability (ESC) system, from external database(s), notification from an incumbent user, and/or from a beacon (which will be subsequently described). One type of protection region is the grandfathered wireless protection zone which is a geographic area and/or frequency spectrum where grandfathered wireless broadband licensees can operate free of interference, e.g., of CBSDs. The foregoing are examples of exclusion zones and protection regions; other type of exclusion and protection regions may occur.

Embodiments of the invention will now be described. Such embodiments address the above cited need to accurately determine actual or prospective locations of radios in a structure. For pedagogical purposes, a structure will be illustrated as a building but can be another type of structure such as a tunnel, etc. For example, a tunnel may be a pedestrian or vehicular tunnel.

A point cloud is created. The point cloud is a three-dimensional representation in space, e.g., of all or a portion of a structure, formed of points and includes relative vector position data for each point. The relative vector position data indicates the relative vector distance from any one point of the point cloud to any other point of the point cloud. Relative position is not based upon a fixed point. For example, a point cloud representation of all or a portion of one or more floors of the building is created.

Geo-location data is obtained for one or more points in or outside of the point cloud, e.g., in the building or by the building, having GNSS signal reception or having known geo-location data. Geo-location data may also be referred to herein as absolute location data. Geo-location data includes three-dimensional location, e.g. latitude, longitude, and altitude, with respect to fixed point(s), e.g. pole(s) of the Earth. Known geo-location data may be obtained, e.g., from surveys. If geo-location data is known for point(s) by a building, then vector distance data must be obtained with respect to one or more points in a point cloud representing part or all of the building.

The point cloud can be used to accurately determine the location(s) of existing radio(s). Further, the point cloud can be used to identify to a radio installer where new radios can be or should be mounted and/or to model signal propagation of radios in the structure.

FIG. 1A illustrates a flow diagram of one embodiment of a method 100A of identifying the location(s) of radio(s) of a shared spectrum system. To the extent that the method 100A shown in FIG. 1A is described herein as being implemented with any of the systems illustrated herein, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner).

The method 100A may be used for existing or new installations of radio(s) in a structure. However, when used for new installations, no direction is provided where to deploy the radio(s) in the structure.

Optionally, if new radio(s) are being installed in a structure, then in block 102 install at least one radio (radio(s)) in a structure. The building may have one or more floors or levels. The radio(s) may be mounted, for example, on the ceiling of hallways and/or rooms. When installed, each radio may be coupled by Ethernet to a power over Ethernet (PoE) port of a network device, such as a power over Ethernet switch; such a connection provides data and power connectivity to the radio.

In block 104, create a point cloud representing at least a portion of a structure, e.g., at least a portion of at least one floor of a building or a portion of a tunnel. For example, the portion of the structure may include hallways and/or rooms where radios may be installed. The point cloud may be created before or after radio(s) are installed the structure.

Typically, the point cloud represents surfaces of objects in a field of view of a sensor to capture data used to generate the point cloud. The point cloud includes a relative location of each point of the point cloud, and thus the relative vector distance between two points of a point cloud is known. To generate the point cloud, some software post processing may be required after the sensor makes measurements.

The sensors capable of generating a three-dimensional laser scanner include three-dimensional laser scanner(s) and/or camera(s). The camera(s) may be in portable computing devices such as a cellular telephone, tablet, and/or laptop computer. The three-dimensional laser scanner(s) can also determine relative vector distance, e.g. between points in the point cloud. More than one scan with different field of views of the portion of the structure may be required to be taken, and aggregated, e.g., by software, to generate a desired representation of surfaces of the portion of the structure.

In block 106, obtain geo-location data for at least one reference point. Each reference point may be at a point in or outside the structure. Each reference point may within the point cloud, e.g., if the reference point is in the structure, or outside of the point cloud, e.g., if the point is outside of the structure or outside of the portion of the structure represented by the point cloud. For any reference point that is outside of the point cloud, then determine also determine at least one vector distance to a corresponding point in the point cloud, e.g. corresponding to a location of the portion of the structure represented by the point cloud. This may also be achieved, e.g., with a three-dimensional laser scanner and/or alternatively with previously measured data, e.g., from a survey or a building information model (BIM). A building information model is a three-dimensional computer aided design (CAD) generated representation of a structure (e.g. walls, floors, etc.) and its corresponding infrastructure (e.g., plumbing, heating, ventilation and air conditioning (HVAC), power distribution, data wiring (including power over Ethernet, etc.).

In block 108, generate geo-location data for one or more points of the point cloud based upon the at least one reference point. This may be done in many different ways. Some examples are subsequently provided for pedagogical purposes only.

For a reference point that is a point of the point cloud, then determine the geo-location data for other points of the point cloud based upon their vector distance from the reference point. Because the geo-location data is known for the reference point, then the geo-location data can be determined for the other points in the point cloud.

If the reference point is in the point cloud but not a point of the point cloud, the geo-location data for one or more points of the point cloud may be determined by interpolation; the geo-location data for any remaining points of the point cloud may be determined based upon the relative vector distance of the remaining points from the point(s) whose location(s) were determined by interpolation.

If a reference point is outside of the point cloud, then determine a vector distance between the reference point and at least one point in the point cloud. For example, this can be accomplished, at least in part, with a laser system and a compass. For example, a vector distance can be measured between the reference point and a point on or in the structure. If the point on or in the structure is not in the point cloud, then additional vector distance(s) can be measured, e.g., with the laser and compass (or magnetometer) and/or using BIM data (e.g. exterior wall or window thicknesses), to a point in the point cloud. If the point in the point cloud is not a point of the point cloud, then interpolation can be used as discussed elsewhere herein. If geo-location data is obtained for more than one reference point, then the sets of geo-location data for all points of the point cloud, where each set is determined using a unique reference point, may be averaged to enhance the accuracy of the geo-location data of the points of the point cloud.

In block 110, identify at least one radio in the portion of the structure corresponding to the point cloud. The radio may be identified different ways. In one embodiment, object recognition software can be programmed with dimension data (e.g., shape(s) of the radio(s) and/or identifier(s) (e.g., product number(s), serial number(s), bar code(s), and/or quick response (QR) code(s)). Optionally, the identifier is of a format used by a shared spectrum system, such as a SAS. The identifier(s) may be reflective, raised, or recessed so as to be recognizable in the point cloud. Optionally, the object recognition software may also include character recognition software (e.g. optical character recognition software, bar code reader software, and/or QR reader software) and thus may automatically identify radios (and determine an identifier uniquely associated with a specific radio if such an identifier was imaged when creating the point cloud). The point cloud may be stored and analyzed in a server, e.g., in a cloud system or local network. Server may also be referred to herein as a processing system or processing circuitry.

Alternatively, a portable computing device with a camera, a display, and/or software (e.g. a smart phone or augmented reality glasses) may be used to manually or semi-automatically identify the at least one radio. In the manual mode, a portable computing device user identifies a radio through software in the device when imaging the radio with the device's camera. The user then manually enters—into software on the portable computing device, an identifier for the identified radio, e.g., based upon a physical label on the radio.

Figure 1B:
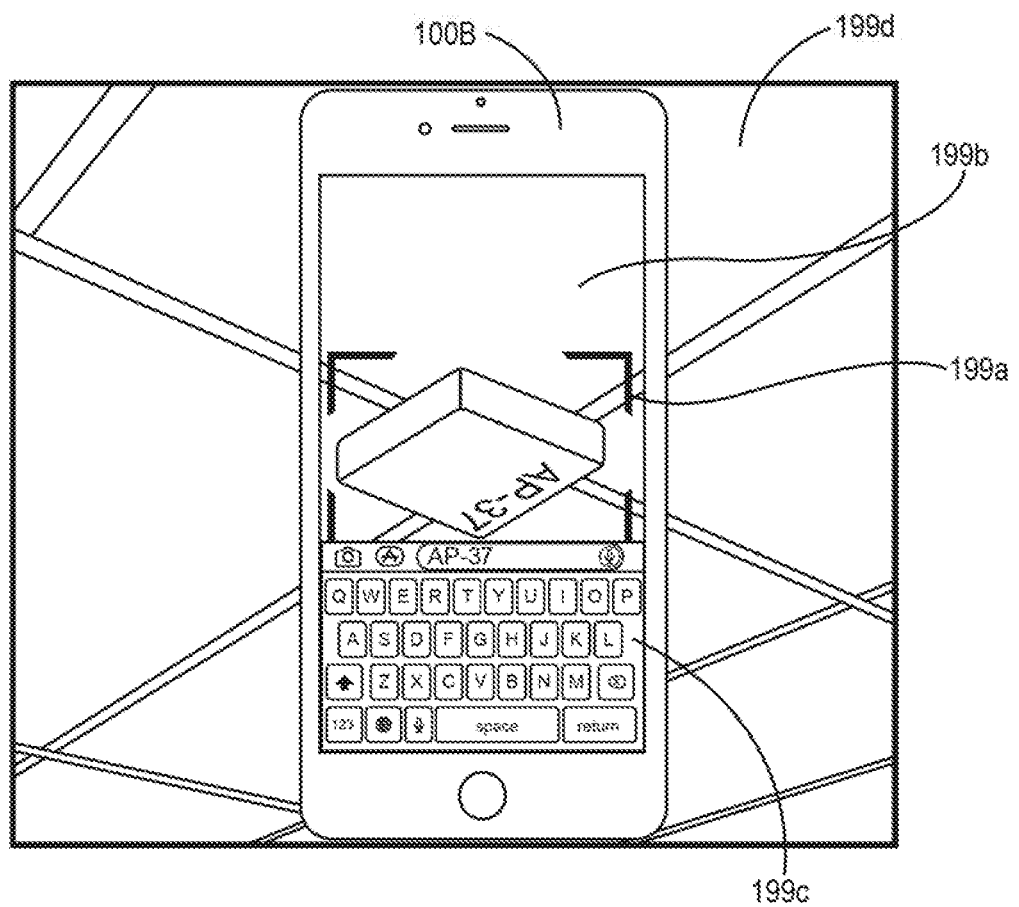
FIG. 1B illustrates a figure of one embodiment of a portable computing device configured to have a user manually identify a radio.

FIG. 1B illustrates a figure of one embodiment of a portable computing device 100B configured to have a user manually identify a radio. The user captures, or identifies, the radio (AP-37), mounted in the structure 199d, in a frame 199a in a display 199b of the portable computing device 199c, and types in the identifier with a keyboard in the display 199b. The manually entered identifier is stored, e.g. in the server for example in the point cloud or elsewhere.

Returning to FIG. 1A, alternatively, in the semi-automatic mode, character recognition software (e.g. optical character recognition software, bar code reader software, and/or QR reader software) automatically determines an identifier from information on the radio. The character recognition software analysis is performed by the server or the portable computing device. The radio identifier stored in the point cloud and/or in, e.g., another file or database, in the server.

In block 112, determine geo-location data for the radio. Optionally, the geo-location data may be known and is included, e.g., encoded, in the identifier. Thus, the location data for the radio can be extracted from the identifier on the radio. Alternatively, or additionally, the geo-location data can be determined when object recognition in the point cloud is used. In such an event, the radio location can be determined based upon geo-location data of points in the point cloud, e.g. which correspond to surfaces of the radio. For example, the geo-location data of the radio may be geo-location data for one or more points of the point cloud on an exposed exterior surface of the radio (e.g. a center of an exterior surface parallel to an exterior surface mounted to a wall or ceiling) representative of location(s) of antenna(s)

of the radio. The exposed exterior surface of the radio would be defined by points of the point cloud.

When using the portable computing device, geo-location data of the radio in the point cloud may be automatically determined by one or more of the following ways. Firstly, using object recognition, the image captured by the camera is mapped to point cloud data. Secondly, using Wi-Fi based location determination (if the portable computing device and the structure include Wi-Fi equipment) (and possibly directional information from a magnetometer/compass in the portable computing device) to determine a location in the point cloud corresponding to the radio. The geo-location data of the radio may further be determined as described above so that the determined position corresponds to location(s) of antenna(s) of the radio. For example, a portable computing device such as a smart phone or augmented reality glasses, can identify the radio using location awareness, or a combination of location awareness and object recognition. For example, location awareness can be implemented in a portable computing device using six degree of freedom sensors. The determined radio geo-location data and identifier may be stored in the point cloud and/or in, e.g., another file or database, e.g., in the server. Optionally, the determined radio location data can be utilized, e.g., by a SAS controller, to determine a maximum transmission power of the radio.

Optionally, in block 114, store the identifier and/or the geo-location data of the radio in the radio. The identifier and/or geo-location data of the radio are transferred from the server and/or the personal computing device to the radio. The transfer may arise due to the server and/or the personal computing device independently pushing the identifier and/or the geo-location data of the radio to the radio, or due to the radio requesting its identifier and/or the geo-location data from the server and/or the personal computing device.

Optionally, in block 116, communicate the identifier and/or geo-location data of the radio to a system, e.g., a modeling system and/or a controller of a shared spectrum system, e.g., a SAS or licensed shared access (LSA) system. Optionally, communicate a requested operating frequency of the radio to the controller from the corresponding radio. For example, the identifier and/or geo-location data of each radio are provided by each radio to a controller of a shared spectrum system during a registration request placed by each radio, e.g., pursuant to WInnForum standard WINNF-TS-0016-V1.2.1 SAS to CBSD Technical Specification, which is incorporated by reference herein in its entirety. Alternatively, or additionally, the identifier and/or the geo-location data of the radio may be provided to the controller of a shared spectrum system by the server using data in the point cloud, e.g., prior to a registration request by the radio. If the controller receives information from both sources, then the controller can verify that the identifier and/or the geo-location data of the radio received from both sources match. If such data does not match, then the controller can request that the data be re-sent from one or both of the sources, or otherwise verified.

The modeling system could estimate the maximum transmit power (and possibly the operating frequencies) of the radios installed in the structure based upon information about maximum transmission power and operating frequencies assigned to other radios, and/or information about primary users. The modeling system may be executed on the server or another computing system. The identifier and/or geo-location data is provided by the radio, the portable computing device, and/or the server to the modeling system or a controller of the shared spectrum system. If provided to the controller of the shared spectrum system, the controller may store the identifier and/or geo-location data of the radio for future use.

Optionally, in block 118, receive, at each radio, a maximum transmission power (or maximum transmission power spectral density) level and/or an operating frequency in the shared spectrum. Such information may be received from a controller of a shared spectrum system including the at least one radio, or from the modeling system. For this block, the identifier, the location, and/or requested operating frequency in shared spectrum of the at least one radio are communicated to a shared spectrum system controller. The maximum transmission power spectral density and operating frequency may be determined by the shared spectrum controller, e.g., pursuant to WInnForum standard WINNF-TS-0112-V1.4.1 CBRS Operational and Functional Requirements, which is incorporated by reference in its entirety. The maximum transmission power (or maximum transmission power spectral density) and/or operating frequency may be provided to at least one of the radio and the portable computing device. In the event that the maximum transmission power (or maximum transmission power spectral density) and/or operating frequency are provided to the portable computing device, such information may be displayed on the screen of the device, e.g., in an augmented reality mode when a camera of the devices is imaging the corresponding radio. The maximum transmission power (or maximum transmission power spectral density) level and/or an operating frequency depend upon the location of a radio, a location of other radios of the shared spectrum system, and the location of primary users.

Figure 1C:
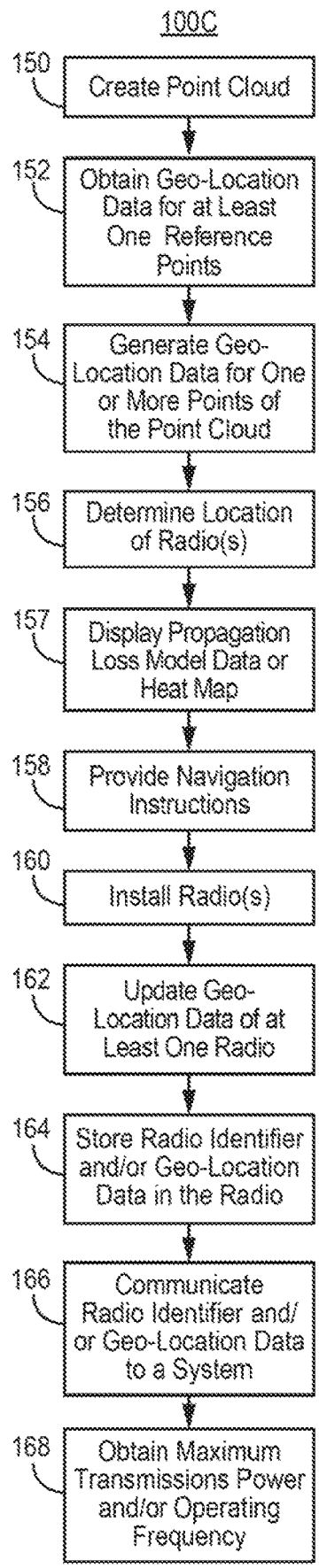
FIG. 1C illustrates a flow diagram of another embodiment of a method of identifying location(s) of radio(s) of a shared spectrum system.

FIG. 1C illustrates a flow diagram of another embodiment of a method 100C of identifying location(s) of radio(s) of a shared spectrum system. To the extent that the method 100C shown in FIG. 1C is described herein as being implemented with any of the systems illustrated herein, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner). The method 100C may be used for new installations of radio(s) in a structure.

In block 150, create a point cloud representing at least a portion of a structure. In block 152, obtain geo-location data for at least one reference point. In block 154, generate geo-data for one or more points of the point cloud based upon the at least one reference point.

In block 156, determine location of at least one radio to be installed. This may be automatically or manually performed using the methods described above. Optionally in block 157, display data from propagation loss model data or a heat map, using electromagnetic modeling software as will be subsequently described, over a view of a corresponding portion of structure using an augmented reality device, e.g. the portable computing device. The data from the propagation loss model data or the heat map may be displayed in numerical form, e.g., in decibels, decibels in reference to milliwatt, or decibels in reference to milliwatt per ten megahertz. Alternatively, the data from the propagation loss model data or the heat map can be displayed with visual indicators such as colors corresponding to ranges of, e.g., decibels, decibels in reference to milliwatt, or decibels in reference to milliwatt per ten megahertz. The data from the propagation loss model data or the heat map may vary as the field of view of the augmented reality device changes. Thus, a person, e.g., an installer, can verify with the augmented reality device that there is sufficient transmission strength from the radio(s) throughout the structure, or at least a portion of the structure intended to have sufficient transmission strength from the radio(s).

In block 158, provide navigation instructions to direct an installer of radio(s) to location(s) where the radio(s) are to be installed. Optionally, communicate the location(s) of the radio(s) to the portable computing device which includes a navigation system configured to provide instructions to an installer, e.g., visually on a screen (e.g., arrows indicating which direction to travel) and/or audibly through a loudspeaker (e.g., voice commands indicating which direction to travel), how to navigate, e.g. hallways, stairs, elevators, and/or rooms, to each location where a radio is to be installed. The navigation instructions also indicated where each radio is to be installed, e.g., with an arrow pointing to a portion of a wall or ceiling. The visual navigation instructions may be displayed on, e.g. a screen of, an augmented reality device.

Alternatively, the navigation system can be in the server, and visual and/or audible navigation instructions can be sent from the server to the portable computing device to be displayed on and/or aurally emitted from the device.

Figure 1D:
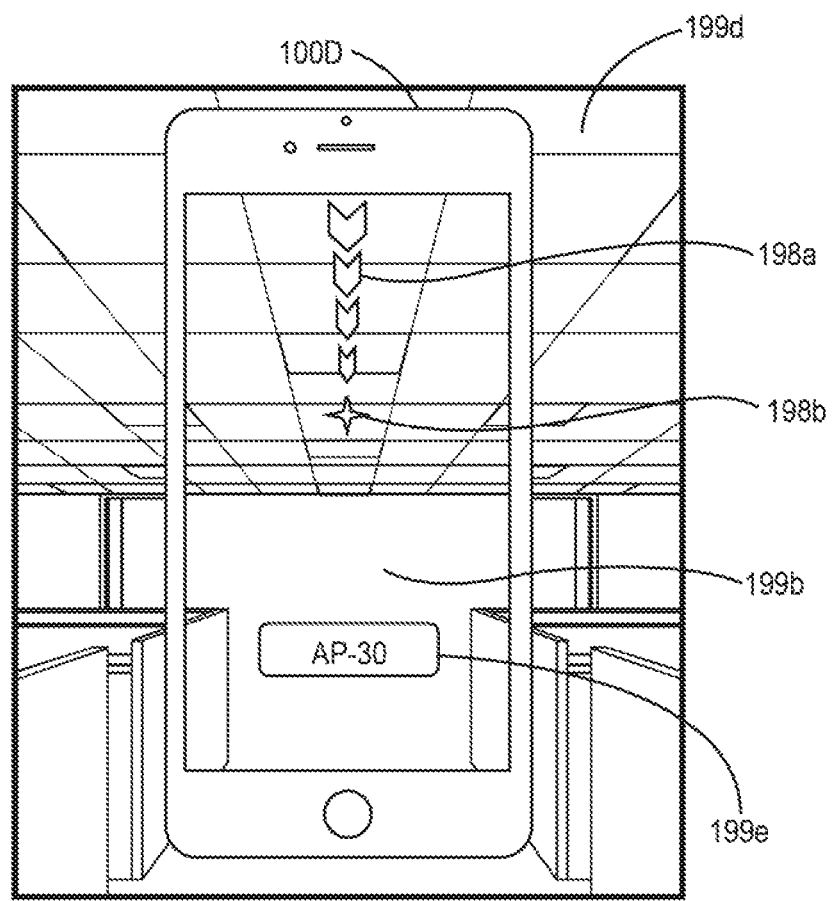
FIG. 1D illustrates a figure of one embodiment of an augmented reality device configured to display navigation instructions to a location where a radio is to be installed.

FIG. 1D illustrates a figure of one embodiment of an augmented reality device 100D configured to display navigation instructions to a location where a radio is to be installed. Optionally, the augmented reality device 100D is a portable computing device. In the illustrated embodiment, first indicators 198a, e.g., arrows, are projected over an image of an interior portion of the structure 199d and displayed with the interior portion on a display 199b of the augmented reality device 100D. A second indicator 198b, e.g., a star, is projected over the image of the interior portion of the structure and displayed with the interior portion on a display. Optionally, an identifier 199e for the radio to be installed is shown on the display 199b. Optionally, the display 199b may identify locations where data and/or power port(s), e.g., power over Ethernet port(s), to which the radio may be coupled to a network such as the Internet or an intranet. In some embodiments, the location(s) of data and/or power port(s) which can be coupled to radios can be determined by performing object recognition in the point cloud, e.g. identifying ports and corresponding identifiers, e.g., face plates. Then, an augmented reality device can used to identify such ports near a radio. In other embodiments, cable(s) may have been deployed which are coupled to port(s) and are configured to be coupled to a radio. To identify such cables, the augmented reality device can be coupled to a cable management system, e.g., an infrastructure management system like CommScope's imVision™ technology.

Returning to FIG. 1C, optionally, display a heat map (subsequently discussed) using augmented reality through an augmented reality device, e.g., on the display of the portable computing device. An installer can thus visualize the signal coverage of the radio(s) at different location(s) in the structure when viewed through the augmented reality device. Note, if the heat map is displayed based upon propagation loss data in a three-dimensional model, then a transmission power must be provided, e.g. by the user, for each radio—which may be the maximum transmission power of the corresponding radio or a fraction thereof.

Optionally, in block 160, an installer installs the radios. Optionally, in block 162, update geo-location data of at least one radio using a portable computing device. If a radio cannot be deployed at an intended location, and is elsewhere installed, the location of that radio must be updated. This can be accomplished using technique(s) described with respect to FIG. 1A and the use of a portable computing device. The updated geo-location data may be stored in the point cloud and/or in software in a portable computing device used to determine the updated geo-location data.

Optionally, in block 164, store the identifier and/or the geo-location data of the radio in the radio. The identifier and/or geo-location data of the radio are transferred from the server and/or the personal computing device to the radio. The transfer may arise due to the server and/or the personal computing device independently pushing the identifier and/or the geo-location data of the radio to the radio, or due to the radio requesting its identifier and/or the geo-location data from the server and/or the personal computing device.

Optionally, in block 166, communicate the identifier and/or geo-location data of the radio to a system, e.g., a modeling system and/or a controller of a shared spectrum system, e.g., a SAS or a LSA system. Optionally, communicate a requested operating frequency of the radio to the controller. For example, the identifier and/or geo-location data of the radio are provided to a controller of a shared spectrum system during a registration request by the radio, e.g., pursuant to WlnnForum standard WINNF-TS-0016-V1.2.1 SAS to CBSD Technical Specification, which is incorporated by reference herein in its entirety. Alternatively, or additionally, the identifier and/or the geo-location data of the radio may be provided to the controller of a shared spectrum system by the server using data in the point cloud, e.g., prior to a registration request by the radio. If the controller receives information from both sources, then the controller can verify that the identifier and/or the geo-location data of the radio received from both sources match. If such data does not match, then the controller can request that the data be re-sent from one or both of the sources, or otherwise verified.

The modeling system could estimate the maximum transmit power (and possibly the operating frequencies) of the radios installed in the structure based upon information about maximum transmission power and operating frequencies assigned to other radios, and/or information about primary users. The modeling system may be executed on the server or another computing system. The identifier and/or geo-location data is provided by the radio, the portable computing device, and/or the server to the modeling system or a controller of the shared spectrum system. If provided to the controller of the shared spectrum system, the controller may store the identifier and/or geo-location data of the radio for future use.

Optionally, in block 168, obtain a maximum transmission power (or maximum transmission power spectral density) level and/or an operating frequency in the shared spectrum for the radio from the controller of the shared spectrum system. For this block, the identifier, the location, and/or requested operating frequency in shared spectrum of the at least one radio are communicated to a shared spectrum system controller. The maximum transmission power spectral density and operating frequency may be determined by the shared spectrum controller, e.g., pursuant to WlnnForum standard WINNF-TS-0112-V1.4.1 CBRS Operational and Functional Requirements, which is incorporated by reference in its entirety. The maximum transmission power (or maximum transmission power spectral density) and/or operating frequency may be provided to at least one of the radio and the portable computing device. In the event that the maximum transmission power (or maximum transmission power spectral density) and/or operating frequency are provided to the portable computing device, such information may be displayed on the screen of the device, e.g., in an augmented reality mode when a camera of the devices is imaging the corresponding radio. The maximum transmission power (or maximum transmission power spectral density) level and/or an operating frequency depend upon the location of a radio, a location(s) of other radio(s) of the shared spectrum system, and the location(s) of primary user(s).

Figure 1E:
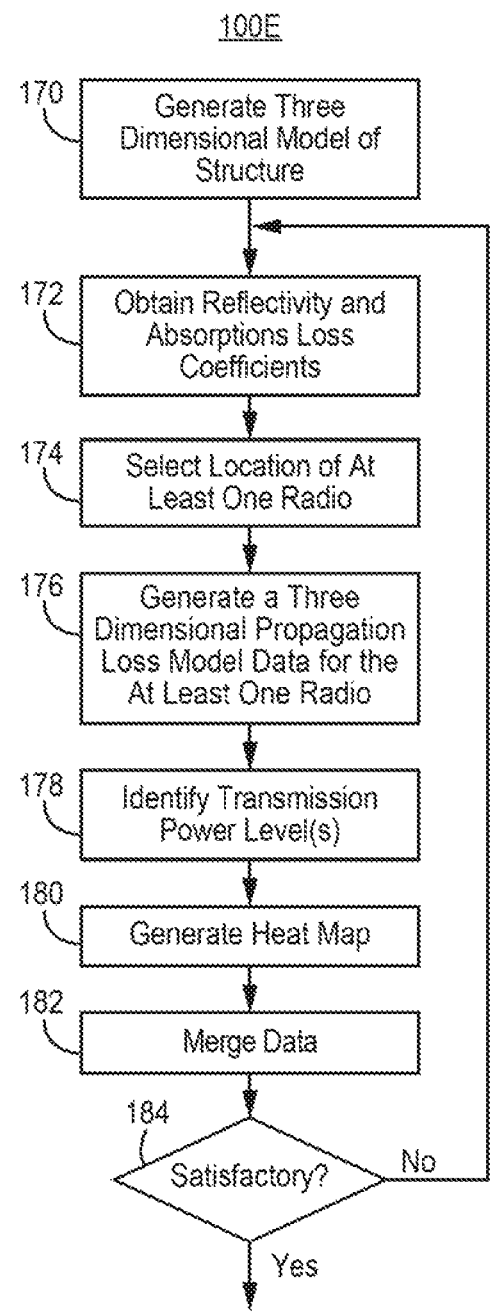
FIG. 1E illustrates a flow diagram of an embodiment of a method of determining location(s) of radio(s), of a shared spectrum system, in a structure.

FIG. 1E illustrates a flow diagram of an embodiment of a method 100E of determining location(s) of radio(s), of a shared spectrum system, in a structure. To the extent that the method 100C shown in FIG. 1C is described herein as being implemented with any of the systems illustrated herein, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner). The method 100E may be used for new installations of radio(s) in a structure. Optionally, this method may be performed in the server or another computing system.

This method presumes creation of a point cloud model, e.g., as illustrated in FIG. 1C. The point cloud should be created wherever a user may want to model propagation loss for a radio, including without limitation prospective location(s) where the radio may be mounted.

In block 170, generate a three-dimensional model of structure, or portion of structure. The portion of the structure may be the portion of the structure for which the point cloud was created, or a different portion of the structure. The three-dimensional model may be automatically created from the point cloud, manually created, and/or created from another source, such as the BIM. The three-dimensional model may be created from the point cloud by performing interpolation between points of the point cloud so that a model of imaged surfaces is generated. Because interpolation is used and the absolute locations of points in the point cloud are known, the absolute location of any point in the three-dimensional model is also known. Further, the relative vector distances between points in the three-dimensional model are known. Object(s) such as radio(s), cable(s), and/or port(s) (e.g., Ethernet, power, and/or power over Ethernet ports) can be merged with the model. The location(s) of the object(s) can be manually identified using augmented reality device(s) and/or using object recognition techniques like those described herein. Thus, the objects can be made part of the three-dimensional model.

In block 172, obtain reflectivity and absorption loss coefficients for elements of the structure. Elements of the structure including walls, doors, windows, and/or floors and/or ceilings. Elements of the structure may also include furniture, equipment, and/or any other objects in the structure.

The reflectivity and absorbent loss coefficients may be determined numerous ways. Two examples are described below. The reflectivity and absorbent loss coefficients may be automatically ascertained from or using the BIM. For example, the BIM may identify the type of materials used to form the walls, doors, windows, floors, and/or ceilings; a separate database, e.g., in the server or another computing system, may identify the of the structure elements. Additionally, or alternatively, such reflectivity and absorption loss coefficients for elements of the structure may be manually entered by a human. The reflectivity and absorbent loss coefficients, generated by any technique, may be or may not be incorporated into the three-dimensional building model.

In block 174, select a location of at least one radio in the structure. The at least one radio should be located where a point cloud has been created in the structure. A human may select, e.g., based upon their experience, the location of the at least one radio.

In block 176, generate three-dimensional propagation loss model data for the at least one radio throughout at least part of the structure. The propagation loss model may be generated for all or a part of the structure. The three-dimensional propagation loss model may be generated using an empirical model, such as the COST231 multi-wall model or a physics based model, such as a ray tracing model. Physics based models are more computationally intensive than the COST231 multi-wall model and may not provide significantly improved accuracy of propagation loss modeling. For the COST231 multi-wall model, propagation loss, $L_T$, is:

$$L_T = L_{FS} + L_c + \sum_{i=1}^{I} k_{wi} L_{wi} + k_f^{\left(\frac{(k_f+2)}{(k_f+1)} - b\right)} L_f \qquad \text{(Equation 1)}$$

where, $L_{FS}$ is the free space path loss for a path directly from transmitter receiver, $L_c$ is an empirically derived constant loss value, $k_{wi}$ is the number of walls crossed by the direct path of type i, $L_{wi}$ is the loss of wall type I, $k_f$ is the number of floors penetrated from transmitter to receiver, and $L_f$ is the loss per floor. The following are exemplary values. For walls, $L_{wi}$=3.4 dB at 1.8 GHz for light walls and $L_{wi}$=6.9 dB at 1.8 GHz for heavy walls. For floors, $L_f$ is 18.3 dB at 1.8 GHz. For example, typically b=0.46. Thus, all or some points of the point cloud will have an associated path loss for each of the at least one radio.

Optionally in block 178, identify a transmission power level for each of the at least one radio. The transmission power level may be identified by a human. The transmission power level may be the maximum transmission power permitted, e.g., by a governmental entity or a standards body, for the radio—or a fraction of the permitted maximum transmission power. Optionally in block 180, generate a heat map. The heat map represents power level at different points in the structure. Using path loss at points, generate a corresponding power (or power spectral density) level at the corresponding points.

In block 182, merge the three-dimensional propagation loss model data and/or the heat map with the three-dimensional model of the structure. Optionally in block 184, determine if the propagation model and/or the heat map is satisfactory. For example, manually by a user or automatically, determine if the placement of the radio(s) provides coverage to the areas of the structure which are intended to be covered. A user may visually view the propagation loss model data and/or the heat map with a graphical user interface. Optionally, the graphical user interface allows a user to visualize the propagation loss model data and/or the heat map in the three-dimensional model of the structure. Optionally, additionally or alternatively, the graphical user interface permits a user to virtually walk through the structure, e.g., in hallways and rooms, to view the propagation loss model data and/or the heat map from different fields of view. If the determined propagation loss model data and/or the heat map are not satisfactory, then return to block 174. If the determined propagation model and/or the heat map are satisfactory, then, optionally, proceed to block 158.

Figure 1F:
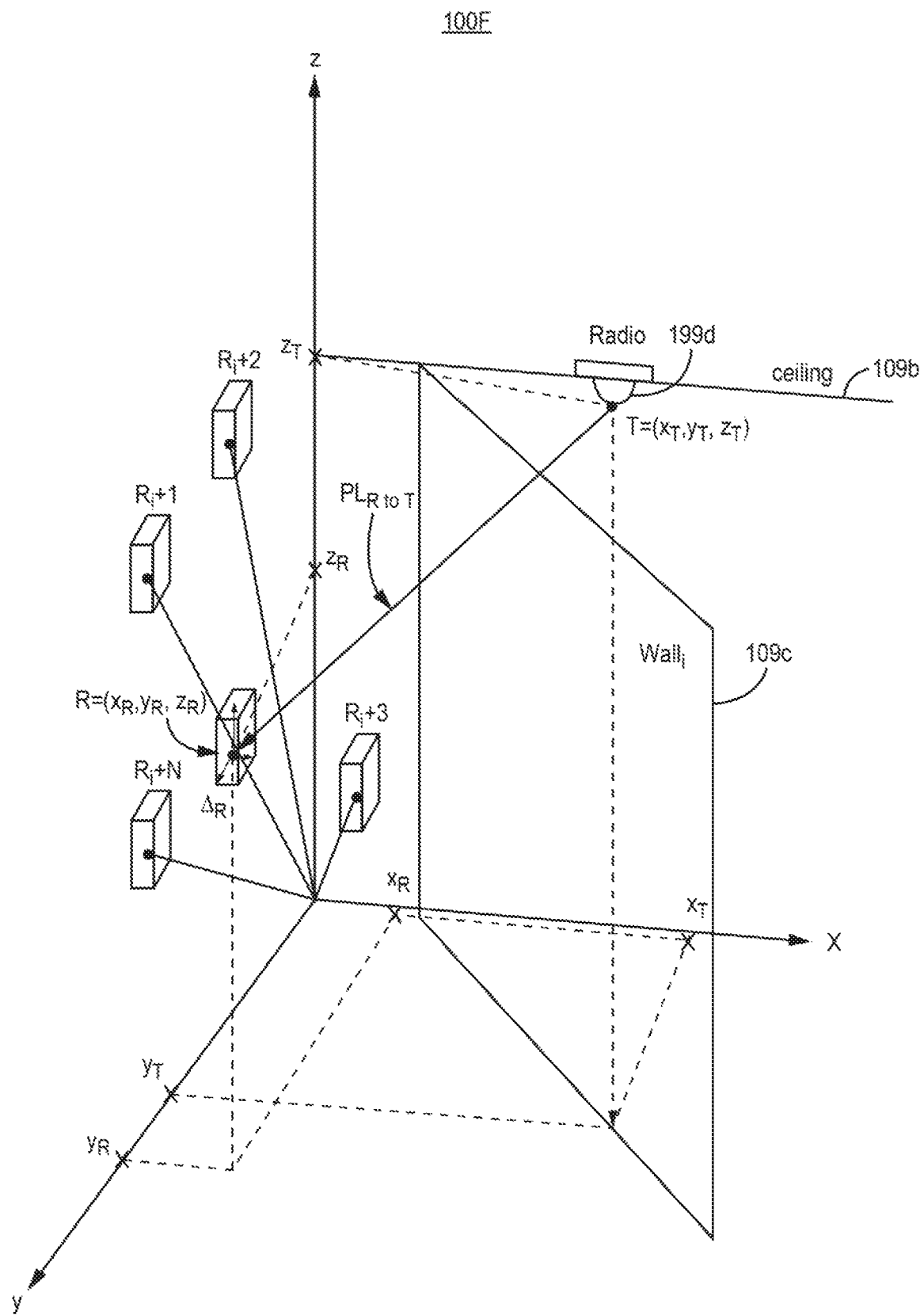
FIG. 1F illustrates a representation of an exemplary augmented reality image of propagation loss data or a heat map as seen with an augmented reality device.

FIG. 1F illustrates a representation of an exemplary augmented reality image 100F of propagation loss data or a heat map as seen with an augmented reality device. A set of visual indicators (numbers or colors) are displayed at different three-dimensional points of a set of points R in a field of view of the augmented reality device. The visual indicators indicate the propagation loss or transmission power (or power spectral density) levels at each point. A real ceiling 109*b* and a real wall 109*c* are viewed with an augmented reality device. The number of points R is proportional to the resolution of the three-dimensional model. A higher resolution propagation loss model may require impractical processing times to compute the propagation path loss at each point in the set R, therefore, the three-dimensional propagation model may interpolate between the set of points R in order to generate a propagation path loss value between adjacent points in set of points R, within practical processing times.

Figure 1G:
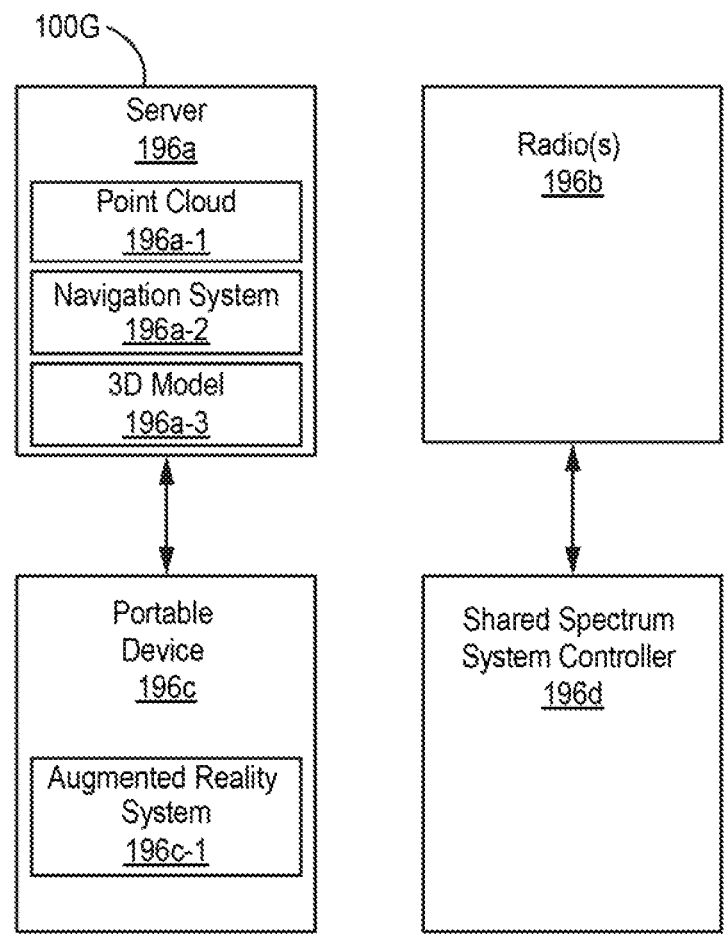
FIG. 1G illustrates a block diagram of one embodiment of a system configured to determine the location of at least one radio of a shared spectrum system in a structure.

FIG. 1G illustrates a block diagram of one embodiment of a system 100G configured to determine the location of at least one radio of a shared spectrum system in a structure. The system 100G includes a server 196*a* communicatively coupled to a portable device, e.g., a portable computing device which may or may not be an augmented reality device. The server 196*a* comprises a point cloud 196*a*-1; optionally, the server 196*a* comprises at least one of all or part of a navigation system 196*a*-2, and the three-dimensional model (3D model) 196*a*-3. All or part of the navigation system may be in the portable device 196*c*. Optionally, the server 196*a* comprises or is communicatively coupled to a communications system (or communications circuitry) configured to facilitate communications between the server 196*a* and the portable device 196*c* and/or a SAS (e.g., a SAS controller).

If the portable device 196*c* provides augmented reality functionality, then the portable device 196*c* including an augmented reality system 196*c*-1, e.g., software that utilizes other capabilities of the portable device 196*c*, e.g. camera(s) and imaging device(s) such as displays. The portable device 196*c* is configured to aid in obtaining geo-location data for at least one radio 196*b* deployed in a structure or to assist in deploying at least one radio in the structure. At least one radio 196*b* is configured to be coupled to a shared spectrum system controller 196*d*. The shared spectrum system controller 196*d* utilizes absolute location data for each radio to assign at least one of a maximum transmission power and transmission frequency to each radio.

Figure 2:
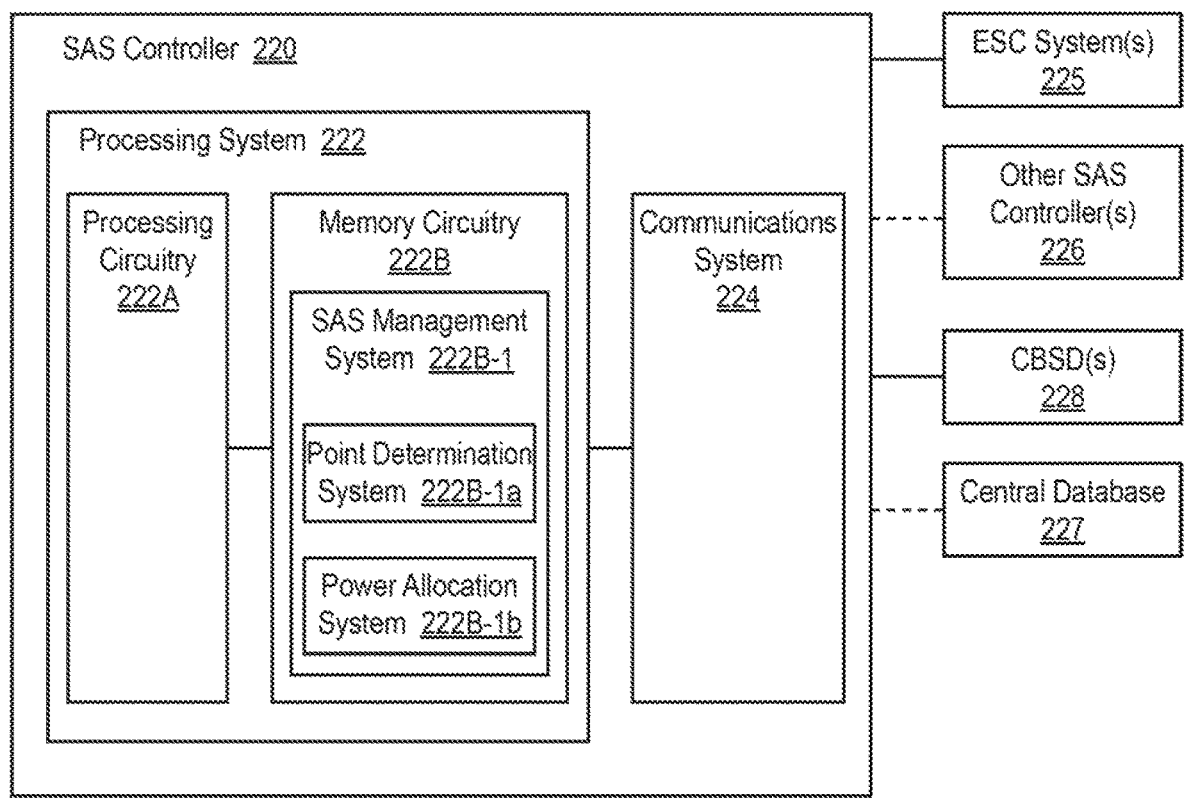
FIG. 2 illustrates a block diagram of one embodiment of a shared access system.

FIG. 2 illustrates a block diagram of one embodiment of a SAS 200. The illustrated SAS 200 includes a SAS controller 220 coupled to one or more CBSDs (CBSD(s)) 228. Each CBSD is operated by a GAA user and/or a PAL.

Optionally, the SAS controller 220 is coupled to at least one environmental sensing capability system (ESC system(s)) 225. Optionally, the SAS controller 220 is coupled to a central database 227, e.g. which has information about when certain incumbent users (such as satellite ground stations) and/or PALs are transmitting. Optionally, the SAS controller 220 is coupled to at least one other SAS controller (other SAS controller(s)) 226, e.g., controlling other CBSDs operating in the same or overlapping frequency spectra. For example, such other CBSDs controlled by other SAS controller(s) 226 and their PALs, GAA users, and associated incumbent users may generate electromagnetic energy that overlaps the geographic region and frequency spectra of the CBSD(s) 228 controlled by SAS controller 220, and thus must be accounted for by the SAS controller 220 when the SAS controller 220 performs interference analysis and authorizes operation of CBSD(s) 228 of the PAL(s) and/or the GAA user(s). Alternatively, the SAS 200 and its PALs and GAA users, may generate electromagnetic energy that overlaps the geographic region of the other SAS controller(s) 226, and thus must be accounted for by the other SAS controller(s) 226 when the other SAS controller(s) 226 perform interference analysis, and authorize operation of CBSDs of PALs and GAA users (associated with the other SAS controller(s) 226). By coupling SASs that are geographically proximate to one another, each SAS can account for electromagnetic energy emitted from those proximate geographies.

Each ESC system detects, and communicates to the SAS controller 220, the presence of signal(s), e.g., from some incumbent user(s), such as RADARs. Alternatively, incumbent users can inform the SAS controller 220 that they are operating, e.g. by transmitting a signal beacon, or communicating with the central database 227 which may be coupled to the SAS controller 220. Prior to notification of operation of an incumbent, the SAS controller 220 models aggregate interference where the incumbent user is or may be located, and may determine whether certain transmission powers of certain CBSDs should be reduced, e.g., to zero, in a frequency spectra. Upon notification of operation of an incumbent user, the SAS controller 220 regulates the operation (e.g., power levels and frequencies of operation) of the CBSD(s) to allow the incumbent user(s) to operate free of interference. The SAS controller 220 otherwise controls the operation (e.g., power levels and frequencies of operation) of the GAA user(s)' CBSD(s) so that the PAL(s) system(s) operate free of interference.

In one embodiment, the SAS controller 220 includes a processing system 222 coupled to a communications system 224. The processing system 222 controls the operation of CBSD(s) 228 that form part of the SAS 200.

The communications system 224 facilitates communications between the SAS controller 220 and other systems or devices, e.g. CBSD(s) 228, the ESC system(s) 225, the central database 227, and/or other SAS controller(s) 226. In one embodiment, the communications system 224 includes a modem, e.g. an Internet data modem, a transceiver, and/or any other communications device(s) that can facilitate communications to the aforementioned devices.

Optionally, the processing system (or processing system circuitry) 222 may be a state machine, e.g., comprised of processor circuitry 222A coupled to memory circuitry 222B; alternatively, the processing system 222 may be implemented in whole or in part as a neural network. In the illustrated embodiment, the memory circuitry 222B includes a SAS management system 222B-1. In the illustrated embodiment, the SAS management system 222B-1 includes a propagation model and point determination system 222B-1*a* and a power allocation system 222B-1*b*. The propagation model and point determination system 222B-1*a* determines which propagation model to use and/or which points of a region to analyze for the power allocation process, as further described herein. The power allocation system 222B-1*b* determines the maximum power level of certain radios.

Optionally, the power allocation system 222B-1b is implemented with power allocation process that operates substantially accordingly to requirement R2-SGN-16; however, the power allocation system 222B-1b may be implemented in other ways to allocate, e.g., equitably, transmission power of CBSDs.

The SAS management system 222B-1 also includes techniques for generating a discovery area around a region including one or more protection points, and determining the aggregate level of interference in frequency spectra at each protection point. To this end, the SAS management system 222B-1 may include propagation models (e.g., free space path loss model, irregular terrain model and/or Hata model (or variations thereof such as the enhanced Hata (eHata) model)) with which to determine path loss between CBSDs and protection point(s). The SAS management system 222B-1 may also include a database of information about CBSDs (e.g., geographic location, height, terrain morphology, and/or effective radiated power information); additionally, and/or alternatively, the SAS management system 222B-1 may remotely obtain such information.

The processor circuit(s) described herein may include one or more microprocessors, microcontrollers, digital signal processing (DSP) elements, application-specific integrated circuits (ASICs), and/or field programmable gate arrays (FPGAs). In this exemplary embodiment, each processor circuit includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuit(s) described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium and executed by the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

Exemplary Embodiments

Example 1 includes a program product comprising a non-transitory processor readable medium on which program instructions are embodied, wherein the program instructions are configured, when executed by at least one programmable processor, to cause the at least one programmable processor to: create a point cloud corresponding to at least a portion of a structure, where the point cloud comprises points and relative vector position data for each point with respect to other points in the point cloud; obtain absolute location data for at least one reference point in or outside of the point cloud, where the absolute location data comprises an absolute geographic location; generate absolute location data for at least one point in the point cloud using the obtained absolute location data; identify, in the at least the portion of the structure, at least one radio that utilizes frequency spectrum shared with a primary user that has priority over the at least one radio to use the shared frequency spectrum; and determine absolute location data of each of the at least one radio, where the absolute location data of each radio is configured to be used to determine a maximum transmit power of a corresponding radio.

Example 2 includes the program product of Example 1, wherein identifying the at least one radio is determined using object recognition within the point cloud.

Example 3 includes the program product of any of Examples 1-2, wherein the program instructions are configured, when executed by at least one programmable processor, to further cause the at least one programmable processor to send, to a radio, at least one of an identifier of a radio and absolute location data of the radio.

Example 4 includes the program product of any of Examples 1-3, wherein the program instructions are configured, when executed by at least one programmable processor, to further cause the at least one programmable processor to send, to a spectrum access system, at least one of an identifier of a radio and an absolute location data of the radio.

Example 5 includes a method, comprising: creating a point cloud corresponding to at least a portion of a structure, where the point cloud comprises points and relative vector position data for each point with respect to other points in the point cloud; obtaining absolute location data for at least one reference point in or outside of the point cloud, where the absolute location data comprises an absolute geographic location; generating absolute location data for at least one point in the point cloud using the obtained absolute location data; identifying, in the at least the portion of the structure, at least one radio that utilizes frequency spectrum shared with at least one primary user that has priority over the at least one radio to use the shared frequency spectrum; and determining absolute location data of each of the at least one radio, where the absolute location data of each radio is configured to be used to determine a maximum transmit power of a corresponding radio.

Example 6 includes the method of Example 5, wherein identifying the at least one radio is determined using object recognition within the point cloud.

Example 7 includes the method of any of Examples 5-6, further comprising sending, to a radio, at least one of an identifier of a radio and absolute location data of the radio.

Example 8 includes the method of any of Examples 5-7, further comprising sending, to a spectrum access system, at least one of an identifier of a radio and an absolute location data of the radio.

Example 9 includes a program product comprising a non-transitory processor readable medium on which program instructions are embodied, wherein the program instructions are configured, when executed by at least one programmable processor, to cause the at least one programmable processor to: create a point cloud corresponding to at least a portion of a structure, where the point cloud comprises points and relative vector position data for each point with respect to other points in the point cloud; obtain absolute location data for at least one reference point in or outside of the point cloud, where the absolute location data comprises an absolute geographic location; generate absolute location data for at least one point in the point cloud using the absolute location data; identify a location, in the at least the portion of the structure, where a radio is configured to be installed and utilizes frequency spectrum shared with at least one primary user that has priority over the radio to use the shared frequency spectrum, and where the absolute location data of the radio is configured to be used to determine a maximum transmit power of the radio; and provide navigation instructions to guide an installer to each of the location.

Example 10 includes the program product of Example 9, wherein providing the navigation instructions comprises sending the navigation instructions to an augmented reality device.

Example 11 includes the program product of any of Examples 9-10, wherein the program instructions are configured, when executed by at least one programmable processor, to further cause the at least one programmable processor to send, to a radio, at least one of an identifier of a radio and absolute location data of the radio.

Example 12 includes the program product of any of Examples 9-11, wherein the program instructions are configured, when executed by at least one programmable processor, to further cause the at least one programmable processor to send, to a spectrum access system, at least one of an identifier of a radio and an absolute location data of the radio.

Example 13 includes the program product of any of Examples 9-12, wherein the program instructions are configured, when executed by at least one programmable processor, to further cause the at least one programmable processor to determine absolute location data of the radio configured to be installed in the portion of the structure.

Example 14 includes the program product of Example 13, wherein determining the absolute location data comprises: generate a three-dimensional model of the at least the portion of the structure; obtain reflectivity and absorption coefficients for elements of the structure; select a location of the radio, where absolute location data is determined from the point cloud for each location; generate propagation loss model data for the radio; and merge the propagation loss model data with the three-dimensional model of the structure.

Example 15 includes the program product of Example 14, wherein the program instructions are configured, when executed by at least one programmable processor, to further cause the at least one programmable processor to: identify a transmit power level for each radio; and generate a heat map based upon the identified transmit power level for each radio and the generated propagation loss model data.

Example 16 includes a method, comprising: creating a point cloud corresponding to at least a portion of a structure, where the point cloud comprises points and relative vector position data for each point with respect to other points in the point cloud; obtaining absolute location data for at least one reference point in or outside of the point cloud, where the absolute location data comprises an absolute geographic location; generate absolute location data for at least one point in the point cloud using the absolute location data; identifying a location, in the at least the portion of the structure, where a radio is configured to be installed and utilizes frequency spectrum shared with at least one primary user that has priority over the radio to use the shared frequency spectrum, and where the absolute location data of the radio is configured to be used to determine a maximum transmit power of the radio; and providing navigation instructions to guide an installer to the location.

Example 17 includes the method of Example 16, wherein providing the navigation instructions comprises sending the navigation instructions to an augmented reality device.

Example 18 includes the method of any of Examples 16-17, further comprising sending, to a radio, at least one of an identifier of a radio and absolute location data of the radio.

Example 19 includes the method of any of Examples 16-18 further comprising sending, to a spectrum access system, at least one of an identifier of a radio and an absolute location data of the radio.

Example 20 includes the method of Example 17, further comprising determining absolute location data of each of the radio configured to be installed in the portion of the structure.

Example 21 includes the method of Example 20, wherein determining the absolute location data comprises: generating a three-dimensional model of the at least the portion of the structure; obtaining reflectivity and absorption coefficients for elements of the structure; selecting a location of the radio, where absolute location data is determined from the point cloud for each location; generating propagation loss model data for the radio; and merging the propagation loss model data with the three-dimensional model of the structure.

Example 22 includes the method of Example 21, further comprising: identifying a transmit power level for each radio; and generating a heat map based upon the identified transmit power level for each radio and the generated propagation loss model data.

Example 23 includes a program product comprising a non-transitory processor readable medium on which program instructions are embodied, wherein the program instructions are configured, when executed by at least one programmable processor, to cause the at least one programmable processor to: generate a three-dimensional model of at least a portion of a structure; obtain reflectivity and absorption coefficients for elements of the structure; select, in the at least the portion of the structure, a location of a radio utilizing frequency spectrum shared with primary users of shared frequency spectrum and used by secondary users of the shared frequency spectrum, where absolute location data is configured to be used to determine a maximum transmit power of the radio, and where the absolute location data is determined from a point cloud for each location; generate propagation loss model data for the radio; and merge the propagation loss model data with the three-dimensional model of the structure.

Example 24 includes the program product of Example 23, wherein the program instructions are further configured, when executed by at least one programmable processor, to cause the at least one programmable processor to: identify a transmit power level for the radio; and generate a heat map based upon the identified transmit power level for the radio and the generated propagation loss model data for the radio.

Example 25 includes a method, comprising: generating a three-dimensional model of at least a portion of a structure; obtaining reflectivity and absorption coefficients for elements of the structure; selecting, in the at least the portion of the structure, a location of a radio utilizing frequency spectrum shared with primary users of shared frequency spectrum and used by secondary users of the shared frequency spectrum, where absolute location data is configured to be used to determine a maximum transmit power of each radio, and where the absolute location data is determined from a point cloud for each location; generating propagation loss model data for the radio; and merging propagation loss model data with the three-dimensional model of the structure.

Example 26 includes the method of Example 25, further comprising: identifying a transmit power level for the radio; and generating a heat map based upon the identified transmit power level for the radio and the generated propagation loss model data for the radio.

Terms of relative position as used in this application are defined based on a plane parallel to the conventional plane or working surface of a layer or substrate, regardless of orientation. The term "horizontal" or "lateral" as used in this application are defined as a plane parallel to the conventional plane or working surface of a layer or substrate, regardless of orientation. The term "vertical" refers to a direction perpendicular to the horizontal. Terms such as "on," "side" (as in "sidewall"), "higher," "lower," "over," "top," and "under" are defined with respect to the conventional plane or working surface being on the top surface of a layer or substrate, regardless of orientation.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A program product comprising a non-transitory processor readable medium on which program instructions are embodied, wherein the program instructions are configured, when executed by at least one programmable processor, to cause the at least one programmable processor to:
   create a point cloud corresponding to at least a portion of a structure, where the point cloud comprises points and relative vector position data for each point with respect to other points in the point cloud;
   obtain absolute location data for at least one reference point in or outside of the point cloud, where the absolute location data comprises an absolute geographic location;
   generate absolute location data for at least one point in the point cloud using the obtained absolute location data;
   identify, in the at least the portion of the structure, at least one radio that utilizes frequency spectrum shared with a primary user that has priority over the at least one radio to use the shared frequency spectrum; and
   determine absolute location data of each of the at least one radio, where the absolute location data of each radio is configured to be used to determine a maximum transmit power of a corresponding radio.

2. The program product of claim 1, wherein identifying the at least one radio is determined using object recognition within the point cloud.

3. The program product of claim 1, wherein the program instructions are configured, when executed by at least one programmable processor, to further cause the at least one programmable processor to send, to a radio, at least one of an identifier of a radio and absolute location data of the radio.

4. The program product of claim 1, wherein the program instructions are configured, when executed by at least one programmable processor, to further cause the at least one programmable processor to send, to a spectrum access system, at least one of an identifier of a radio and an absolute location data of the radio.

5. A method, comprising:
   creating a point cloud corresponding to at least a portion of a structure, where the point cloud comprises points and relative vector position data for each point with respect to other points in the point cloud;
   obtaining absolute location data for at least one reference point in or outside of the point cloud, where the absolute location data comprises an absolute geographic location;
   generating absolute location data for at least one point in the point cloud using the obtained absolute location data;
   identifying, in the at least the portion of the structure, at least one radio that utilizes frequency spectrum shared with at least one primary user that has priority over the at least one radio to use the shared frequency spectrum; and
   determining absolute location data of each of the at least one radio, where the absolute location data of each radio is configured to be used to determine a maximum transmit power of a corresponding radio.

6. The method of claim 5, wherein identifying the at least one radio is determined using object recognition within the point cloud.

7. The method of claim 5, further comprising sending, to a radio, at least one of an identifier of a radio and absolute location data of the radio.

8. The method of claim 5, further comprising sending, to a spectrum access system, at least one of an identifier of a radio and an absolute location data of the radio.

9. A program product comprising a non-transitory processor readable medium on which program instructions are embodied, wherein the program instructions are configured, when executed by at least one programmable processor, to cause the at least one programmable processor to:
   create a point cloud corresponding to at least a portion of a structure, where the point cloud comprises points and relative vector position data for each point with respect to other points in the point cloud;
   obtain absolute location data for at least one reference point in or outside of the point cloud, where the absolute location data comprises an absolute geographic location;
   generate absolute location data for at least one point in the point cloud using the absolute location data;
   identify a location, in the at least the portion of the structure, where a radio is configured to be installed and utilizes frequency spectrum shared with at least one primary user that has priority over the radio to use the shared frequency spectrum, and where the absolute location data of the radio is configured to be used to determine a maximum transmit power of the radio; and
   provide navigation instructions to guide an installer to each of the location.

10. The program product of claim 9, wherein providing the navigation instructions comprises sending the navigation instructions to an augmented reality device.

11. The program product of claim 9, wherein the program instructions are configured, when executed by at least one programmable processor, to further cause the at least one programmable processor to send, to a radio, at least one of an identifier of a radio and absolute location data of the radio.

12. The program product of claim 9, wherein the program instructions are configured, when executed by at least one programmable processor, to further cause the at least one programmable processor to send, to a spectrum access system, at least one of an identifier of a radio and an absolute location data of the radio.

13. The program product of claim 9, wherein the program instructions are configured, when executed by at least one programmable processor, to further cause the at least one programmable processor to determine absolute location data of the radio configured to be installed in the portion of the structure.

14. The program product of claim 13, wherein determining the absolute location data comprises:
generate a three-dimensional model of the at least the portion of the structure;
obtain reflectivity and absorption coefficients for elements of the structure;
select a location of the radio, where absolute location data is determined from the point cloud for each location;
generate propagation loss model data for the radio; and
merge the propagation loss model data with the three-dimensional model of the structure.

15. The program product of claim 14, wherein the program instructions are configured, when executed by at least one programmable processor, to further cause the at least one programmable processor to:
identify a transmit power level for each radio; and
generate a heat map based upon the identified transmit power level for each radio and the generated propagation loss model data.

16. A program product comprising a non-transitory processor readable medium on which program instructions are embodied, wherein the program instructions are configured, when executed by at least one programmable processor, to cause the at least one programmable processor to:
generate a three-dimensional model of at least a portion of a structure;
obtain reflectivity and absorption coefficients for elements of the structure;
select, in the at least the portion of the structure, a location of a radio utilizing frequency spectrum shared with primary users of shared frequency spectrum and used by secondary users of the shared frequency spectrum, where absolute location data is configured to be used to determine a maximum transmit power of the radio, and where the absolute location data is determined from a point cloud for each location;
generate propagation loss model data for the radio; and
merge the propagation loss model data with the three-dimensional model of the structure.

17. The program product of claim 16, wherein the program instructions are further configured, when executed by at least one programmable processor, to cause the at least one programmable processor to:
identify a transmit power level for the radio; and
generate a heat map based upon the identified transmit power level for the radio and the generated propagation loss model data for the radio.

* * * * *